(12) United States Patent
Kulczyk et al.

(10) Patent No.: US 7,856,337 B2
(45) Date of Patent: Dec. 21, 2010

(54) METHOD AND APPARATUS FOR MONITORING THE ROTATIONAL SPEED OF THE SHAFT OF A GAS TURBINE

(75) Inventors: Wojciech Konrad Kulczyk, Hampshire (GB); Anthony Palmer, Hampshire (GB); Matthew Clifton-Welker, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 0 days.

(21) Appl. No.: 12/318,032

(22) Filed: Dec. 19, 2008

(65) Prior Publication Data
US 2009/0177434 A1    Jul. 9, 2009

(30) Foreign Application Priority Data
Dec. 21, 2007    (GB)    ................... 0725072.3

(51) Int. Cl.
*G01P 3/00* (2006.01)
*G01R 11/00* (2006.01)
*G01M 15/00* (2006.01)

(52) U.S. Cl. .................. 702/145; 324/137; 73/114.26

(58) Field of Classification Search ........... 702/145, 702/148, 149; 324/173, 229, 137, 139; 73/114.01, 73/114.26
See application file for complete search history.

(56) References Cited

U.S. PATENT DOCUMENTS

| | | | |
|---|---|---|---|
| 3,984,713 A | 10/1976 | Presley | |
| 4,037,157 A | 7/1977 | Campbell | |
| 4,095,120 A * | 6/1978 | Moran et al. | ............. 290/44 |
| 4,358,828 A | 11/1982 | Reid et al. | |
| 4,814,704 A | 3/1989 | Zerrien, Jr. et al. | |
| 4,902,970 A | 2/1990 | Suquet | |
| 4,967,153 A | 10/1990 | Langley | |
| 5,170,365 A | 12/1992 | Callopy et al. | |
| 5,400,268 A | 3/1995 | Katsuda et al. | |
| 5,541,859 A * | 7/1996 | Inoue et al. | ............. 702/148 |
| 5,559,705 A | 9/1996 | McClish et al. | |
| 5,703,283 A | 12/1997 | McClish et al. | |
| 5,747,680 A | 5/1998 | McArthur | |
| 5,942,893 A | 8/1999 | Terpay | |
| 6,225,770 B1 | 5/2001 | Heinrich et al. | |
| 6,462,535 B1 | 10/2002 | Schwabe | |
| 2002/0125880 A1 | 9/2002 | Murai et al. | |
| 2004/0083800 A1 | 5/2004 | Yonezawa et al. | |

(Continued)

FOREIGN PATENT DOCUMENTS

DE    197 29 981    1/1999

(Continued)

OTHER PUBLICATIONS

Official Action dated Jan. 12, 2010 in U.S. Appl. No. 12/318,029.

(Continued)

*Primary Examiner*—Bryan Bui
(74) *Attorney, Agent, or Firm*—Nixon & Vanderhye P.C.

(57) ABSTRACT

A method (and corresponding apparatus) for monitoring the rotational speed of the shaft of a gas turbine having a number of spaced blades on or rotating with the shaft. The invention compensates for the errors which arise from the relative movement of turbine blade tips by deriving a correction factor for each blade and continually updating that correction factor.

10 Claims, 5 Drawing Sheets

U.S. PATENT DOCUMENTS

| | | |
|---|---|---|
| 2005/0127905 A1 | 6/2005 | Proctor et al. |
| 2006/0015288 A1 | 1/2006 | Ai et al. |
| 2007/0044548 A1 | 3/2007 | Ishizauka et al. |

FOREIGN PATENT DOCUMENTS

| | | |
|---|---|---|
| DE | 197 36 712 | 2/1999 |
| DE | 100 17 107 | 10/2001 |
| EP | 0 310 823 | 4/1989 |
| EP | 0 169 670 | 3/1993 |
| EP | 1 189 065 | 3/2002 |
| EP | 0 846 951 | 9/2002 |
| EP | 1 564 559 | 8/2005 |
| GB | 1386035 | 3/1975 |
| GB | 2198241 | 6/1988 |
| GB | 2223103 | 3/1990 |
| GB | 2265221 | 9/1993 |
| GB | 2 281 624 | 3/1995 |
| GB | 2414300 | 11/2005 |
| WO | WO 92/19977 | 11/1992 |
| WO | WO 00/08475 | 2/2000 |
| WO | WO 01/77692 | 10/2001 |
| WO | WO 03/070497 | 8/2003 |

OTHER PUBLICATIONS

Related U.S. Appl. No. 12/318,031, filed Dec. 19, 2008, Kulczyk et al.
Related U.S. Appl. No. 12/318,029, filed Dec. 19, 2008, Kulczyk et al.
UK Search Report dated Apr. 8, 2008 for GB 0725076.4.
UK Search Report dated Mar. 27, 2008 for GB 0725078.0.
UK Search Report dated Mar. 25, 2008 for GB 0725072.3.
UK Search Report dated Mar. 26, 2008 for GB 0725073.1.
EP Search Report dated Apr. 16, 2009 for EP 08254075.8.
EP Search Report dated May 4, 2009 for EP 08254077.4.
EP Search Report dated May 4, 2009 for EP 08254078.2.
EP Search Report dated May 4, 2009 for EP 08254076.6.
EP Search Report dated Sep. 23, 2009 for EP 08254075.8.

* cited by examiner

METHOD AND APPARATUS FOR MONITORING THE ROTATIONAL SPEED OF THE SHAFT OF A GAS TURBINE

This application claims priority to Great Britain Application No. 0725072.3, filed 21 Dec. 2007, the entire contents of which are hereby incorporated by reference.

BACKGROUND OF THE INVENTION

1. Field of the Invention

The present invention is concerned with method and apparatus for monitoring the rotational speed of the shaft of a gas turbine, having a number of spaced blades on or rotating with the shaft. In particular, the invention is concerned with monitoring the speed of gas turbines having blades mounted such that the blade tips can move relative to each other. Embodiments of the invention are concerned with methods and apparatus for processing signals in order to calculate, with high accuracy and a fast response time, the rotational speed of a gas turbine shaft.

Particular preferred embodiments of the invention that are described below in more detail may be used to generate a sequence of outputs or signals which represent the rotational speed of a gas turbine shaft. Preferred embodiments of the invention easily and effectively compensate for blade movement relative to the shaft, and missing signals or gas turbine blades.

The rotational speed of, for example, a shaft such as a gas turbine shaft may be determined by measuring the time intervals between successive evenly spaced projections rotating with the shaft as they pass a single measuring point or sensor. If the spacing between projections is known, the speed is easily determined from the time or period between the passage of successive projections past the sensor or measuring point.

2. Discussion of Prior Art

The speed of a rotating gas turbine shaft is typically monitored by monitoring the movement of a metallic toothed phonic or tone wheel which rotates with the gas turbine shaft. A magnetic speed probe monitors the changes in a magnetic field as a tooth passes through it. The passage of each tooth generates a probe signal pulse or peak and the probe signal train is used to calculate the rotational speed of the toothed wheel by measuring the time between successive pulses, or counting a number of pulses in a fixed time. The rotational speed of the gas turbine shaft is then derived from the speed of the phonic or tone wheel.

Magnetic variable reluctance sensors (including transformer probe sensors such as that disclosed in EP 169,670) can be used to monitor the movement of a phonic wheel and therefore the rotational speed of a rotating shaft coupled to the phonic wheel.

There is no easy access to the turbine shaft, so the toothed or phonic wheel is typically at a distance from the shaft and connected thereto via a long gear train. A big disadvantage of such a system is that the gear train is expensive and heavy, and can only be replaced during a major engine overhaul. An alternative to the remote phonic wheel coupled to the turbine shaft by a gear train is to mount the phonic wheel directly on the shaft. However this requires additional space inside the engine for the wheel and probe fixture.

Eddy current sensors such as that disclosed in GB 2,265,221 can also be mounted on the outside of an engine and used to measure the rotational speed of a gas turbine shaft by directly monitoring movement of the blades mounted on the rotating shaft. If the separation between blades is known, then the rotational speed can be determined from the time between successive signal pulses where each signal pulse or peak corresponds to passage of a blade past the sensor.

Patent numbers GB 2,265,221, GB 2,223,103, U.S. Pat. No. 3,984,713 and GB 1,386,035 each describe eddy current or inductive sensors which may be used to measure the rotational speed of a bladed shaft. The sensors described in these documents are speed or torque sensors, each comprising a magnet positioned so that the tips of the blades pass in close proximity to the magnet. When a blade is moving close to the sensor magnet, eddy currents are generated in the tip of the blade. These eddy currents generate their own magnetic fields which are detected by a coil located in the sensor. A rotating shaft with blades, such as that in a gas turbine, will therefore generate a series of pulses with the period between pulses representing the period between successive blades as they pass the sensor. The series of pulses can be used to determine the speed of the rotating shaft; the speed is calculated from the time measurements between the pulses or from the time it takes for a pre-determined number of blades to pass the sensor.

It is possible to use other types of sensors to monitor movement of the turbine blades themselves past a measuring point, such as optical, capacitative or RF (radio frequency) sensors, but these sensors cannot operate through the turbine casing and require direct access to the blades through a hole in the casing.

Determining speed from measurements of the time taken for successive blades to past a measuring point (i.e. the blade period) requires the distance between blades to be known. The blades are nominally or theoretically evenly spaced and hence the distance is known. However, as discussed in more detail below, in reality the distance between the blades of a gas turbine is not the same for all the blades of a moving gas turbine, and the distance between two blades can and does vary as the gas turbine rotates.

A method of calculating shaft speed by measuring a time interval between consecutive blades passing a single sensor has been described in GB 2,414,300. The inventors of the subject application are the first to realise that the method described in GB 2,414,300 is not suitable for shaft speed measurement when a fast response time is required. Effective operation of the predictor-limiter method described in GB 2,414,300 requires processing of time information from several time intervals and, especially when the rotational speed of the shaft is low, the response time of the system can be very slow. This is clearly problematic in applications where response time and accuracy are critical.

SUMMARY OF THE INVENTION

The inventors of the subject invention have overcome this limitation by providing a method of calculating shaft rotational speed from a single time period measurement so that the rotational speed is continually updated as the tip of each successive blade is sensed by the sensors.

A problem with measurement systems such as those described in GB 2,265,221, GB 2,223,103, U.S. Pat. No. 3,984,713 and GB 1,386,035 arises when the distance between blades varies. In a bladed shaft such as a gas turbine shaft, a cause of such variations is so-called blade jitter. The compressor blades of a gas turbine are fixed to a disc mounted on the gas turbine shaft by a pin attachment (see FIG. 2(a)). This means that the centrifugal, air pressure and friction forces which act on moving blades can cause the blade tips to move relative to each other and/or the shaft. It is this effect which the inventors have named "blade jitter" and which is referred to as blade jitter in this document. The movement of the blades (the so-called "blade jitter") can result in a continually varying error. This means that it is necessary to continually compensate for such errors if accurate speed measurements are to be derived by timing the period between blades. The error compensation must also be quick if the speed measurement system is to have a fast response time.

The inventors have realised that it is possible to calculate the shaft rotational speed to a high degree of accuracy and with a fast response time by using information extracted from a previous complete revolution of the shaft to modify data obtained from a current rotation of the shaft. As will be discussed in more detail below, the method and apparatus of preferred embodiments of the invention allow one to compensate for the movement (i.e. jitter) of the blades relative to each other and hence the shaft to which they are attached.

Figure 2A:
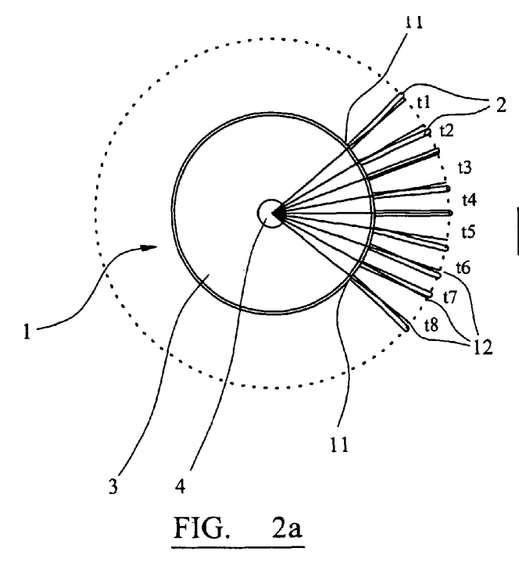
Figure 3:
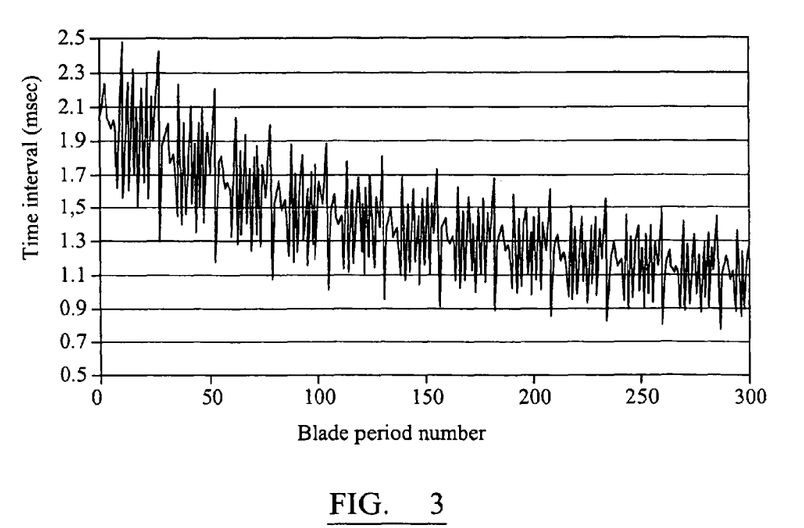
FIG. 3 illustrates a variation of time intervals between consecutive blades when a shaft such as that of FIG. 2a is accelerating at a rate of about 2000 rpm/s from a speed of about 1000 rpm.

As shown in FIG. 2a, jitter is caused by blades 2 (or blade tips) not being in their nominal equally spaced positions 12. This offset from the nominal position results from the fact that blades are each mounted on a pin though their base 11 and the forces acting thereon can cause the blades 2 to pivot around their respective pin. This movement or jitter can cause, even at a constant rotational speed, the blade period times measured from blade to blade to differ from one blade to the next, causing it to appear as if the rotational speed is constantly changing. The speed change is not smooth and continuous, but appears as repeating variation or error as shown in FIG. 3.

It has been previously been assumed that displacement of the blades from their nominal position would be fairly stable for a particular start-up, but may vary between start-ups as friction 'locks' the blades in position when the centrifugal forces come into play at relatively low speed. High speed was expected to cause high frictional forces to act on the pin holding the blade to the central wheel, so that the blade would no longer move. The inventors have, however, observed that the blades are not locked at high speeds, but move slowly during turbine rotation. This is believed to be caused by variations in the air pressure force acting on the blades.

Another possible source of error in the determination of the time intervals between blades is the failure to detect a blade. It might happen for example, that the speed sensor will not detect the presence of the blade and will not produce a pulse signal. This might be caused by a damaged blade (e.g. bent or broken tip), or simply the pulse amplitude might be too small to be detected by the processing circuitry.

Missing pulses mean that the apparent time between the blades appears much longer and therefore results in a low speed calculation generated from the time measurements.

The problems of imprecise and varying pulse location caused by jitter, and missing pulses discussed above make it difficult to accurately measure the speed of rotating gas turbine shafts. However, there is a clear and necessary demand for a turbine shaft speed measuring system which can provide with a fast response time and a high degree of accuracy, speed readings under severe conditions (which may include one or more damaged blades resulting in one or more missing pulses), and which should operate reliably under different shaft acceleration and deceleration conditions.

The present invention provides a method as defined in the independent claims to which reference should now be made.

The claimed invention allows for the determination of accurate speed measurements which include a correction for the errors caused by the continuous movement of gas turbine blades relative to the shaft on which they are monitored and whose speed of rotation is being monitored. The inventors are the first to realise that the continuously varying errors caused by the nature of the pinned attachment of compressor blades can be corrected for by using a correction factor derived from a previous revolution of the shaft. Although the error caused by the so-called blade jitter (see, for example, FIGS. 2a, 3 and 4) vary continuously as the shaft rotates, the inventors are the first to recognise that although the rate of change is high enough to create potentially significant errors in determined speed calculations if not compensated for, the rate of change is slow enough for a correction factor derived from a previous revolution to provide an accurate output with a fast system response time.

The claimed invention compensates for continuously varying errors which are likely to arise when monitoring blade tips which can move relative to each other as pinned turbine compressor blades can.

Some preferred features of the invention are set out in the dependent claims to which reference should now be made.

BRIEF DESCRIPTION OF THE DRAWINGS

Preferred embodiments of the present invention will be described, by way of example only, with reference to the attached figures. The figures are only for the purposes of explaining and illustrating preferred embodiments of the invention and are not to be construed as limiting the claims. The skilled man will readily and easily envisage alternative embodiments of the invention in its various aspects.

In the figures:

FIGS. 2a and 2b are a schematic illustration of a speed sensor set up to determine the time intervals between successive tips of the blades of a turbine as they move past the sensor, in which FIG. 2a illustrates the sensor set-up and FIG. 2b illustrates the output signal train;

FIG. 4 is a diagram illustrating the effect of a missing pulse and ±7.5% blade jitter on the blades of a turbine such that of FIG. 2a;

BRIEF DESCRIPTION OF THE DRAWINGS

Figure 1:
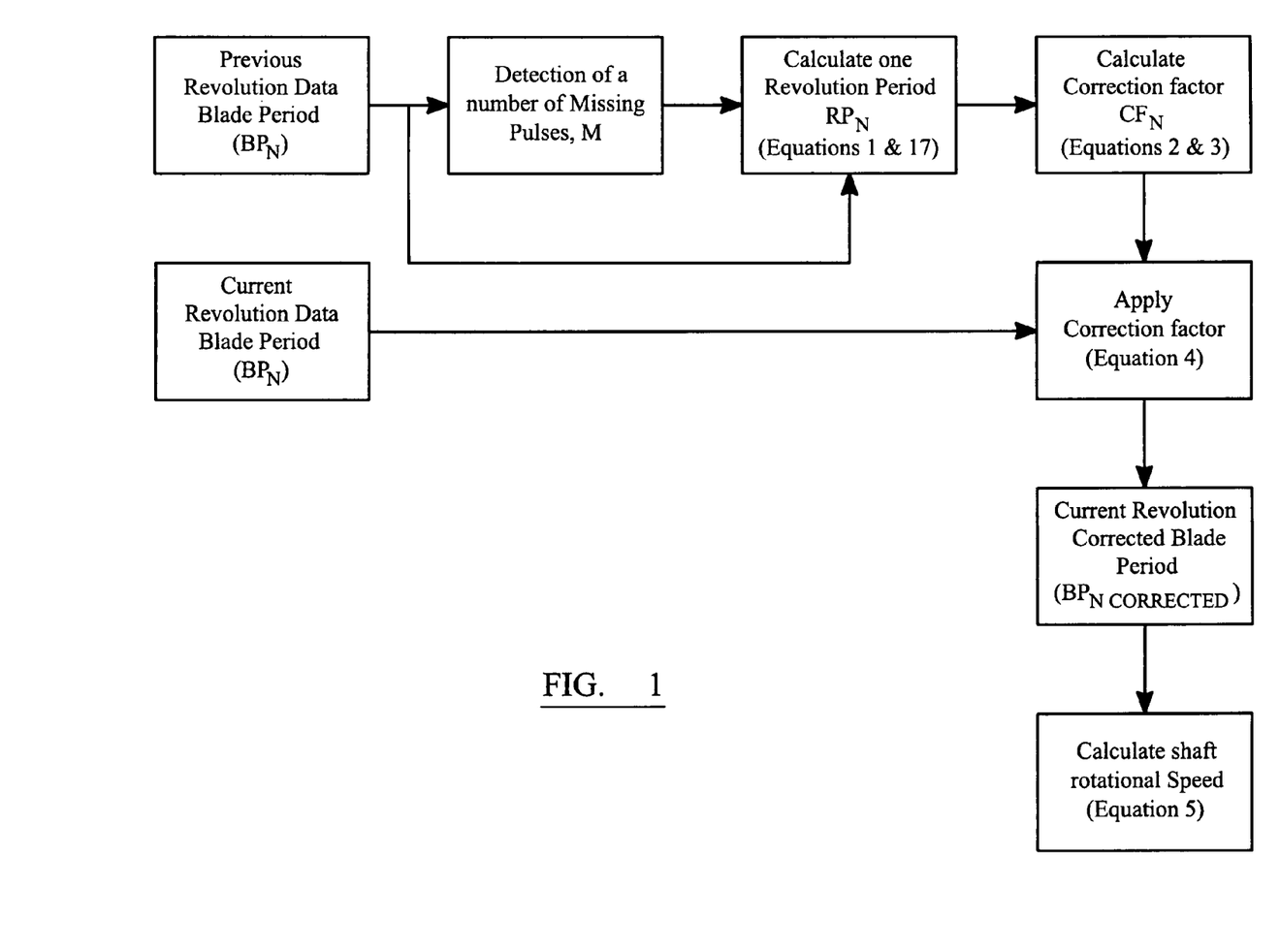
FIG. 1 is a block diagram showing an overview of a shaft speed measurement system with a missing pulse detection system embodying the invention.

An overview of a preferred embodiment of the invention is illustrated by the flow diagram of FIG. 1.

Figure 2B:
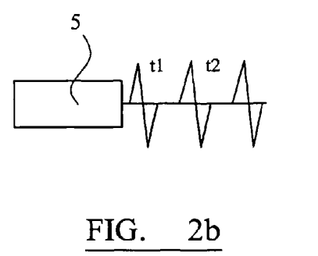

In an embodiment of the present invention, the speed of an individual gas turbine shaft having, say, twenty-nine blades 2 (see FIGS. 2a and 2b) is measured using a speed sensor such as the eddy current sensor type described in GB 2,265,221. The sensor measures the time interval between changes in the current induced therein and has its output connected to data processing apparatus. The data processing apparatus may be a digital engine control unit, or a separate data processing unit delivering signal to a digital engine control unit.

The system shown in FIG. 1 allows for a fast response time and accurate measurement by using a single current sensed time measurement to produce a speed signal but correcting this using a correction factor derived from historical time measurements derived from a previous revolution of the bladed shaft.

A correction factor is derived from a complete historical revolution of the shaft for each blade and is then applied to the sensed current blade time to determine a corrected rotational speed. The sensed current blade time is then used to update the correction factor for the next sensed blade time for that blade. The regularity with which the correction factor is updated depends on the desired accuracy of the output and the likely size of the blade jitter error. The correction factor for each blade can be updated each time a new blade period for that blade is sensed, or less often if the error or its rate of change is lower because, for example, the turbine has been running continuously for a significant period at a constant speed so the blade jitter is unlikely to be changing significantly for several revolutions. Blade jitter is likely to be varying more, with the more change in speed of the turbine so it is likely to be appropriate to update the correction factor more often, the more the turbine speed is changing (i.e. accelerating or decelerating). The rate of change of jitter errors depend also on variations in the air intake (for example guide vane movement, controlling/affecting the amount of intake air). In aero engines, the rate and change of jitter error may also be affected by air pressure when an aircraft is climbing, changes in the angle of attack of the blades, a wake an aircraft from in front, turbulence and moisture.

Tests also indicate the age of the turbine affects the values of jitter. Tests found jitter values of the range of 4 or 5% on new turbines but up to 17% on old turbines.

The embodiments described below update the correction factor with every new sensed blade period. However, it is possible to update the correction factor less often and still reap benefits from the invention.

Referring to FIG. 2a which shows a bladed gas turbine shaft 1, a shaft 4 has a disc 3 connected thereto. The disc has twenty-nine blades 2 (not all shown) fixed thereto at equal points spaced around the shaft's circumference. Each blade 2 is fixed to the disc by a pin (not shown) at or near the base 11 of each blade. Each blade 2 can therefore pivot about or swivel on its pin (or "jitter") in a range of about +/−20 degrees.

Speed sensor 5 is located near the path of the rotating blades and notes the passage of each blade tip as it passes the sensor. The sensor produces a pulse as a tip passes it. There may be significant errors produced by the jitter and missing pulses.

In this text, reference is made to signal pulse or peak. For a magnetic sensor, what happens is that as a feature approaches and then moves away from the sensor, a signal similar to a single sine wave results (i.e. having positive and negative peaks). The position of the pulse for the purposes of the described embodiments is usually taken to be the zero crossing point between the positive and negative peaks. Blade periods are measured between successive zero crossings.

A data processor (not shown) is coupled to the speed sensor 5 which receives as an input the sequence of pulses generated by the sensor.

The data processor includes a counter which determines the time interval between successive signal pulses or peaks (t1, t2, etc., see FIG. 2b) produced by the sensor. The time interval between successive signals at sensor 5 provides the blade period $BP_N$ (FIG. 1). These time intervals may be stored in a memory.

As the blade periods between successive blades passing the sensor vary due to blade jitter, the blade periods cannot be used directly to produce accurate shaft rotational speed measurements.

The inventors of the subject invention have appreciated that the position of each blade changes slowly over one complete revolution of the shaft and it is possible to measure and record the blade positions of each of the blades during one complete shaft revolution i.e. the latest completed revolution of the shaft. As discussed above, this information can then be used to apply a correction factor to each successive blade period that is recorded by the sensor and attached circuitry during the next revolution.

Since it is possible to know the total number of blades and the time period of one complete revolution of the bladed shaft (the cumulative total of the individual blade periods over one shaft revolution), the average shaft speed over the latest complete shaft revolution can be calculated. This calculation of rotational speed is not normally affected by the jitter because the sum of the blade jitters (i.e. the sum of the movement of each blade relative to its nominal position) over one revolution is equal to, or close to, zero. This is because for every increase in blade separation caused by jitter of a particular blade, there is a corresponding decrease because as one blade, for example, moves closer to the preceding blade, it must move further away by the same distance from its following blade. Tests show that, assuming the blade being considered has not moved or "jittered", the sum of the jitter around one revolution up to that blade is less than 0.1% of the nominal blade to blade separation or distance.

During the previous complete revolution of the bladed shaft, individual time intervals between successive blades passing a sensor (the blade periods) are recorded in the form:

$BP_1 \ldots BP_N \ldots BP_K$ where: K is the total number of blades on the bladed shaft, and A cumulative total of the blade periods for the latest complete revolution—the revolution period, $RP_N$,—is calculated by:

$$RP_N = \sum_{i=N-K/2}^{i=N+K/2} BP_i \quad (1)$$

where:
K is the total number of blades on the bladed shaft,
N is the number identifier of the blade period; and
i is the summation index In order to avoid large speed errors due to turbine speed changes from one revolution to the next, particularly during engine start-up, the revolution period is calculated and updated as each new blade period is recorded by the sensor and associated circuitry. The revolution period therefore always comprises the sum of all the blade periods for one complete shaft revolution up to and including the latest measured blade period. The accuracy of the shaft speed measurement is further improved as the revolution period is calculated in such a way that the latest recorded blade period value ($BP_N$) is in positioned in the middle of the sequence of the blade periods that are summed to calculated the rotation period—see Equation 1.

As each successive blade passes the sensor, a nominal blade period ($BP_{NOMINAL}$) over the last complete revolution (the revolution period) is then be calculated by:

$$BP_{NOMINAL} = \frac{RP_N}{K} \quad (2)$$

As each successive blade passes the sensor generating a new latest blade period value, a correction factor for the Nth blade period, $CF_N$, is calculated by:

$$CF_N = \frac{BP_N}{BP_{NOMINAL}} \quad (3)$$

The correction factor is then applied to the latest measured blade period to produce a corrected blade period, $BP_{N(CORRECTED)}$:

$$BP^*_{N(CORRECTED)} = \frac{BP^*_N}{CF_N} \quad (4)$$

Where * denotes the corresponding blade (having the same number identifier) period during the current (latest) revolution Once $BP_{N(CORRECTED)}$ is known, the shaft rotational speed is then calculated by:

$$EngineSpeed = \frac{60}{BP^*_{N(CORRECTED)} xK}(rpm) \quad (5)$$

The shaft speed can be updated for each new measured blade period, providing a high accuracy of rotational speed measurement and a fast response time.

To guarantee accuracy and integrity of speed measurements it is necessary to know the number of blades or, more precisely, the number of nominal blade periods making up a complete shaft revolution. A problem arises in the event that one or more pulses are not generated by the sensor when a blade tip passes the sensor.

In operation, the speed sensor may not detect the presence of one or more blades and as a result, they will not generate a pulse signal. This may be caused by one or more blades being damaged (e.g. having a bent or broken tip), or the pulse amplitude generated by the sensors might be too small to be detected by the processing circuitry connected to the sensors. This condition shall be referred to as the presence of 'missing pulses'.

If one or more missing pulses are present, the apparent time between successive blades passing the sensor (the blade period) appears much longer than the condition where there are no missing pulses. This results in a low shaft speed calculation compared to when there no missing pulses. It is therefore important to compensate for missing pulses when calculating shaft rotational speed.

To simplify the following description of the preferred embodiment, normalised times will be used, where '1' shall represent the nominal time period between perfectly positioned blades (i.e. blades having no blade jitter) passing the sensor.

Figure 4:
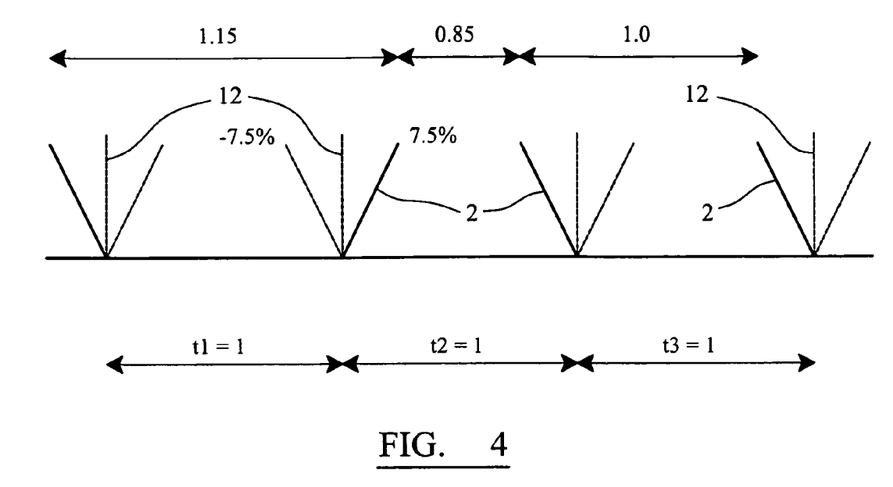
Figure 5:
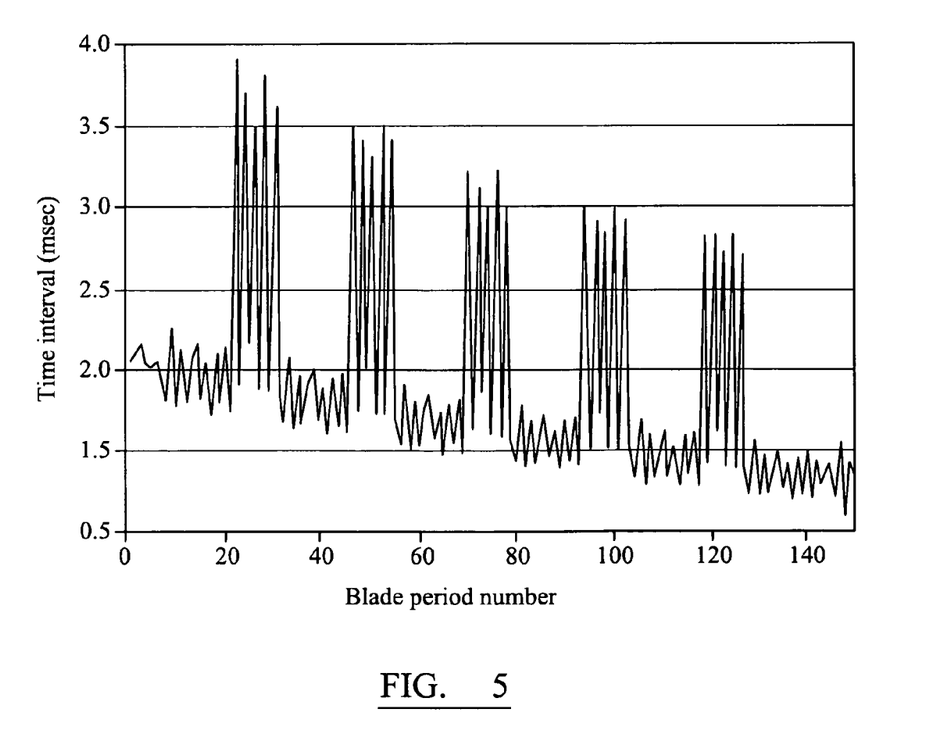
FIG. 5 illustrates a variation of the intervals between consecutive blades for a shaft such as that of FIG. 2a, but when five missing blade pulses or peaks are missing, rotating at 1000 rpm and accelerating at a rate of about 2000 rpm/s from a speed of about 1000 rpm.

For example, if there is assumed to be ±7.5% blade jitter on each blade (i.e. blade jitter expressed as a percentage of nominal or theoretical blade separation) as shown in FIG. 4, this will cause the blade period to vary between a minimum blade period of:

$BP_{MIN}=1-2\times0.075=1-0.15=0.85$ and a maximum blade period of:

$BP_{MAX}=1+2\times0.075=1+0.15=1.15$

However, when one missing pulse is present, as shown in FIG. 4, the normalised minimum blade period is calculated by:

$BP_{MIN}=1+1-(2\times0.075)=1.85$ and a maximum blade period is calculated by:

$BP_{MAX}=1+1+2\times0.075=2.15$

Therefore, the presence of a single missing pulse gives a nominal normalised blade period of 2, two missing pulses give a nominal BP of 3, and so on.

Various methods for detecting the number of missing pulses present in a number of measured blade periods are envisaged and shall now be considered in turn. In the following discussions of the methods, 'AV' is used for the number of blade periods over which an average blade period is taken, and 'M' is the total number of missing pulses present in the sample (see FIGS. 6 and 8).

Figure 6:
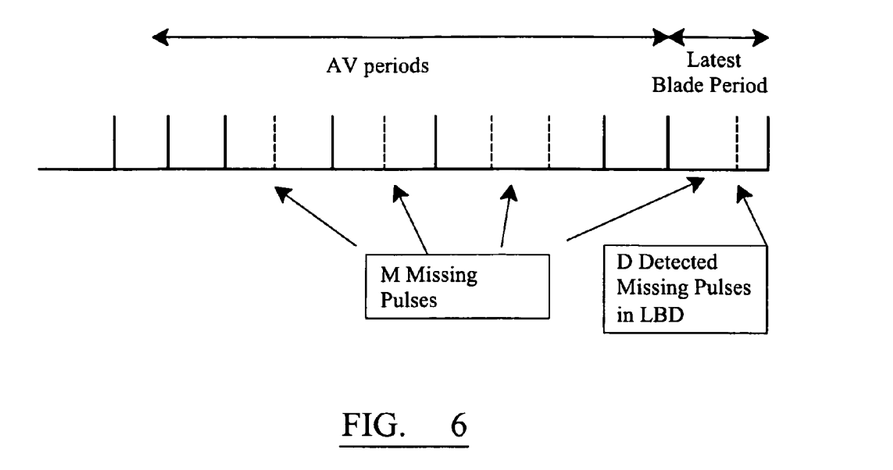
FIG. 6 is a diagram illustrating the effect of missing signal pulses or peaks corresponding to missing, worn or damaged blades.

One method of detecting missing pulses is based on finding the ratio, R, of the latest blade period (LBP) to the average blade period over the last AV periods of measurements ($BP_{AV}$) (see FIG. 6). In this method, the AV number of periods does not include the latest blade period.

As each successive blade tip passes the sensor, a pulse is generated and the attached circuitry measures the latest blade period (the elapsed time between successive blades passing the sensor) and these values are stored in the memory.

When a predetermined number AV of blades have been detected by the sensor, an average blade period over the AV periods is calculated. The values of LBP and $BP_{AV}$ are then used to calculate the Ratio, R, of the latest blade period (LBP) to the average blade period over the last AV periods of measurements ($BP_{AV}$).

Using this method of detecting missing pulses, if there are 'M' missing pulses in a compressor disc having 'K' blades and in the latest blade period, there are 'D' missing pulses (FIG. 6), the latest blade period is given by:

$$LBP=D+1\pm2\times j \quad (6)$$

where: j is the maximum value of blade jitter

The total of the blade periods to be averaged is:

$$T=AV+M\pm2\times j \quad (7)$$

The average blade period over the last AV periods is then calculated by:

$$BP_{AV}=T/AV \quad (8)$$

The ratio of the latest blade period to the average blade period over the last AV periods of measurements is then calculated by:

$$Ratio = LBP/BP_{AV} = (LBP/T) \times AV \quad (9)$$

This ratio is at a maximum when LBP has its largest value and T has its smallest value (Equation 10).

This ratio is at a minimum when LBP has its smallest value and T has its largest value (Equation 11).

$$Ratio_{MAX} = AV \times \frac{D+1+2\times j}{AV + M - 2\times j} \quad (10)$$

$$Ratio_{MIN} = AV \times \frac{D+1-2\times j}{AV + M + 2\times j} \quad (11)$$

Figure 7:
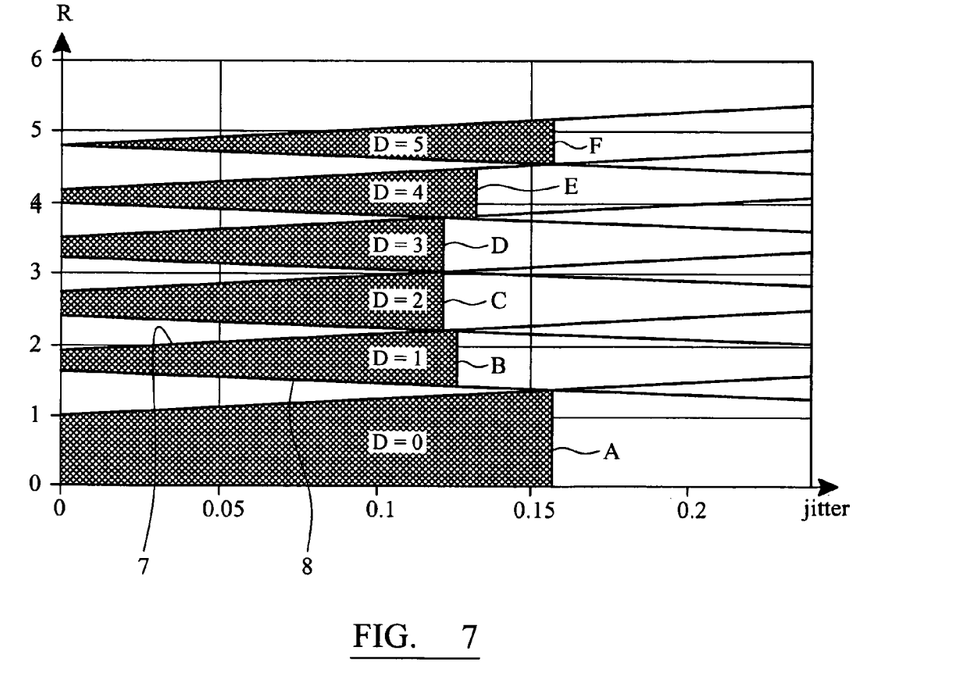
FIG. 7 is a graph showing, for a pulse or signal train such as that of FIG. 6, the dependence of the ratio of the latest blade period time to the average blade period time over the last AV periods on the total number of missing pulses, M, for a given number of detected pulses, D, in the latest blade period, as a function of blade jitter.

By way of an example of detecting the total number of missing pulses in AV blade periods, Equations 10 and 11 have been used to calculate the $Ratio_{max}$ and $Ratio_{min}$ for various values of blade jitter and various values of D (number of missing pulses in last blade period) and M (number of missing pulses in a single revolution of compressor disc). FIG. 7 is a graph showing the relationship between the Ratio, R, and the jitter value, calculated for: AV=20, D=0 to 2 and M=0 to 5.

For each value of D, the 'relevant lines' are the outermost lines (e.g. lines 7, 8 for D=1, where 7 is the line corresponding to D=1, M=5, minimum and 8 is the line corresponding to D=1, M=1, maximum) plotted for that value of D, (see FIG. 7).

As each successive blade passes the sensor 5, the value of R (see equation 9) for the latest blade period is calculated by the system's data processors. FIG. 7 illustrates the calculations carried out by software implementing the invention to create a look-up table listing the number of missing pulses which correspond to calculated vales of the ratio R and values of blade jitter. If the calculated vale of R (when plotted on the graph of FIG. 7) lies in the region before the relevant lines for one D value cross those for another D value—i.e. where the value of R lies within one of hatched regions A, B, C, D, E or F of FIG. 7, the value of D can be ascertained from the graph as there is only one possible region or outcome.

For example, (see FIG. 7), if when AV=20 and M is between 0 and 5, the value of jitter is 0.12, and the calculated value of the ratio, R, is 1.9, R falls within hatched region B of FIG. 7, the graph shows that the value for D (missing pulses in latest blade period) is therefore 1. However, if when AV=20 and M is between 0 and 5 and the value of jitter is say 0.2, the value of the ratio R will fall to the right of hatched region B, beyond the maximum allowable jitter limit. As a result, D cannot be ascertained from the graph of FIG. 8. Experiments suggest that jitter values are not that great so the software algorithms with look-up tables matching the hatched values of FIG. 7 (and table 1 below) graph can be used as such situations are unlikely to arise.

For a turbine compressor disc having, say, twenty-nine blades, AV must be less than 29-M, but the larger it is the better resolution it has, so 20 is a compromise.

The M and D values are selected as 0 to 5 because, in practice, when 5 out of 29 blades are damaged, turbine vibrations are so large that the turbine must be shut down. M and/or D could however be equal to 6, 7, 8 or 9.

To simplify the process described above of determining the value of D, the value of D that corresponds to a range of values of R for the latest blade period can be put in a table format as shown below in Table 1.

TABLE 1

Calculation of D for given ranges of R

| Range of values of ratio | Max. jitter value | No. of missing pulses, D |
|---|---|---|
| 0 < R < 1.34 | 0.156 | 0 |
| 1.34 < R < 2.183 | 0.128 | 1 |
| 2.18 < R < 2.98 | 0.12 | 2 |
| 2.98 < R < 3.75 | 0.12 | 3 |
| 3.754 < R < 4.49 | 0.131 | 4 |
| 4.49 < R | 0.159 | 5 |

As described above, it is only possible to find D for a value of R where the jitter value does not exceed the given maximum jitter value given in Table 1 which corresponds to the jitter limit of the hatched regions A to F (FIG. 7). If the value of blade jitter exceeds this maximum permissible jitter value, the calculations cannot be performed.

The maximum value of jitter for a given turbine is established during a separate test. In practice, the blade jitter experienced by the turbine blades during shaft rotation is much smaller than the limits given in Table 1. Software implementing the invention can therefore work with a look-up table matching table 1.

To establish the number of missing pulses, M, in a full revolution of the bladed shaft, the calculations have to be performed K–ΣD times, where: K is the number of blades attached to the compressor disc, and ΣD is the sum of detected missing pulses in the Latest Blade Period.

D is measured during every measurement, so the sum of Ds should give M, but the calculations are performed K–ΣD times to try and avoid counting the same Ds twice.

Figure 8:
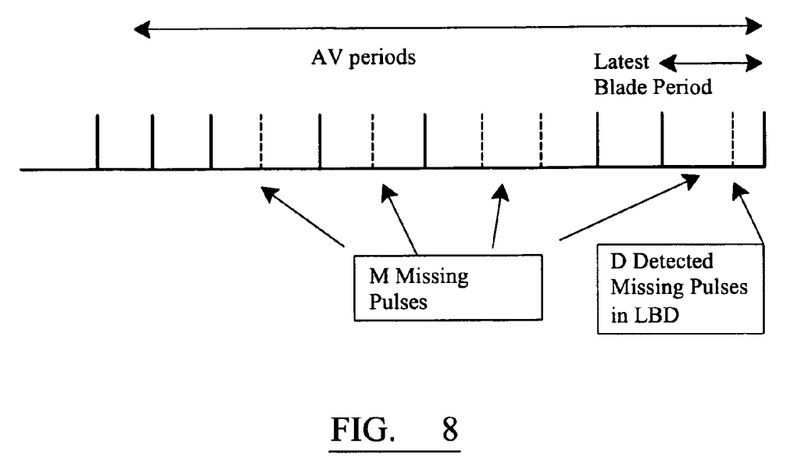
FIG. 8 is a diagram similar to that of FIG. 6, but showing the presence of M missing pulses in AV periods, with D missing pulses being present in the latest blade period and the AV periods including the latest blade period.

In the second method of detecting the presence of missing pulses, the number of blade periods to be averaged, AV, includes the Latest Blade Period as shown in FIG. 8. Therefore, the total AV time period may include more missing pulses than in the previously described method as, in the subject method, AV includes both any missing pulses M and any missing pulses D.

In the subject method, the cumulative total of the blade periods to be averaged is:

$$T = AV + (M-D) \pm 2 \times j \quad (12)$$

The average blade period is calculated by:

$$BP_{AV} = T/AV \quad (13)$$

The ratio of the latest blade period to the average blade period over the last AV periods of measurements is then calculated by:

$$Ratio = LBP/BP_{AV} = LBP/T \times AV$$

Again, this ratio is at a maximum when LBP has its largest value and T has its smallest value (Equation 14 below) and the ratio is at a minimum when LBP has its smallest value and T has its largest value (Equation 15 below).

$$Ratio_{MAX} = AV \times \frac{D+1+2\times j}{AV + M - D - 2\times j} \quad (14)$$

$$Ratio_{MIN} = AV \times \frac{D+1-2\times j}{AV + M - D + 2\times j} \quad (15)$$

The same process as that described for the above method is then used to ascertain the values of D and M for use in calculating the shaft rotational speed.

A third method of detecting the presence of missing pulses is based on measurements of blade to blade times using the predictor-limiter method described in GB 2,414,300 whose contents are hereby incorporated in their entirety by way of reference.

When the blade jitter values are larger than the maximum permissible values listed in Table 1, or it is possible that more than 5 missing pulses may be present it may be more reliable to use a method based on the measurements of blade to blade times using the predictor-limiter method of GB 2,414,300 which is based on blade to blade time measurements. The predictor-limiter arrangement of GB 2,414,300 works by predicting blade time periods from historical sensed blade time periods. Only sensed blade time periods which fall within a defined range of acceptable values are used to calculate predicted time periods with blade time periods outside the range of acceptable values being ignored as likely to correspond to a missing pulse or blade. The predicted blade time periods are used to calculate the speed of the shaft.

The predictor limiter-method removes missing pulses blade periods and therefore blade to blade time measurements give us a Reference Period.

Using this method, the number of missing pulses present in one period is obtained by calculation of the ratio:

$$R = \frac{\text{Latest Blade Period}}{\text{Reference Period}} \quad (16)$$

The latest blade period is the elapsed time between pulses produced by successive blades passing a single sensor and is calculated by:

$$LBP = D + 1 \pm 2 \times j$$

where:
D is the number of missing pulses, and
j is the jitter value.

The Reference Period is obtained using predictor-limiter calculations as described in GB 2,414,300. In normalised notation, the reference period is equal to 1, hence the ratio of Equation 16 is simply equal to the latest blade period.

The calculations must be performed K−ΣD times to establish M as for method 1 described above.

Figure 9:
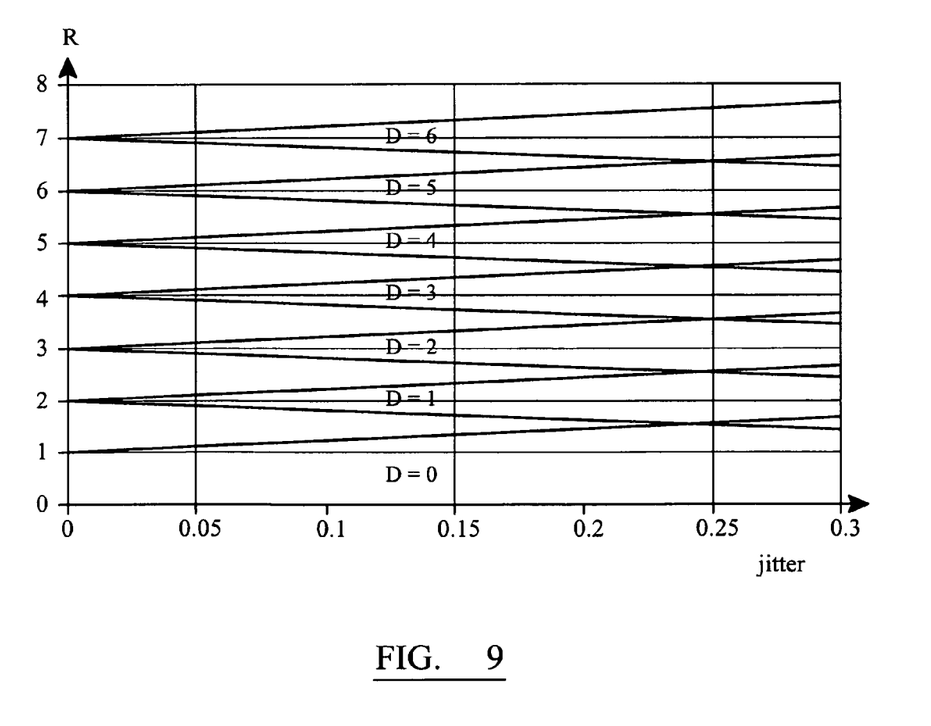
FIG. 9 is a graph showing calculated values of the ratio of the latest blade period time to the average blade period time over the last AV periods for different numbers of detected missing pulses, D, as a function of jitter using the predictor limiter method described in GB 2,414,300.

The results of calculations of the ratio are shown in FIG. 9. Again, to simplify the calculations, the value of D for various ranges of the ratio value, R, calculated using Equations 14 and 15 are shown below in Table 2.

TABLE 2

Calculation of D for ranges of the ratio, R

| Range of Values of Ratio | Max. Jitter range | No. of missing pulses D |
|---|---|---|
| 0 < R < 1.5 | 0.25 | 0 |
| 1.5 < R < 2.5 | 0.25 | 1 |
| 2.5 < R < 3.5 | 0.25 | 2 |
| 3.5 < R < 4.5 | 0.25 | 3 |
| 4.5 < R < 5.5 | 0.25 | 4 |
| 5.5 < R < 6.5 | 0.25 | 5 |
| 6.5 < R | 0.25 | 6 |

As with the previous methods of determining the number of missing pulses, the value of D is only admissible where the maximum blade jitter value is not exceeded. In practice, blade jitter of 0.25 is never observed, hence the value of D should always be ascertainable from Table 2. Software implementing the invention can therefore work with an equivalent look-up table.

Whichever method of determining the number of missing pulses present is employed, the result is the total number of missing pulses, M, that result from a complete revolution of the bladed shaft.

Where M missing pulses are present and the revolution period is calculated using Equation 1, the result would be a large error in the shaft rotational speed as some of the blade periods will be significantly longer than the others. It is therefore essential that the number of missing pulses is known and that this is taken into account when calculating rotation period and subsequently, the shaft rotational speed.

In the presence of missing pulses the revolution period is calculated for K−M Blade Periods:

$$RP_N = \sum_{i=N-K/2-M}^{i=N+K/2} BP_i \quad (17)$$

where: M is the number of missing pulses.

Once the correct $RP_N$ is known the shaft rotational speed is calculated using Equations 2-5.

Equation (17), like Equation (1) improves the shaft rotational speed calculation as the revolution period is updated with each new blade period and is calculated in such a way that the latest recorded blade period value ($BP_N$) is positioned in the middle of the sequence of the blade periods that are summed to calculated the rotation period.

As each successive blade passes the sensor, the latest blade period is measured which enables the current value of M to be updated and the sum of the blade periods over one revolution of the bladed shaft to be calculated. Finally, the shaft rotational speed is calculated and updated.

A result of the preferred embodiment of the invention is that the shaft rotational speed can be calculated from a single blade period measurement and is updated as each successive blade period is recorded. This means that shaft rotational speed can measured with a faster response time and a higher degree of accuracy than that which is achievable by previous methods of rotational speed measurement.

Features of preferred embodiments of the invention in its various aspects are set out in the following numbered paragraphs:

1. A method of monitoring the rotational speed of the shaft of a gas turbine having a pre-determined number of spaced blades on or rotating with the shaft, and wherein the tips of the blades can move relative to each other, the method including monitoring the blade time period between successive blades as they pass a sensor, and deriving a correction factor associated with each blade time period for correcting future sensed blade time periods, wherein the method includes the steps of:
   i) providing a sensor for sensing movement of said spaced blades;
   ii) determining the current blade time period between the passage of successive spaced blades past the sensor;
   iii) deriving a correction factor for a said blade time period by:
      a) determining the revolution time period for a single revolution of the shaft past the sensor, by summing the blade time periods over a single revolution of the shaft;

b) determining an average or nominal blade time period by dividing the revolution time period by the total number of spaced blades in a on or rotating with the shaft; and
c) determining the correction factor for a said blade time period, the correction factor being the ratio of the blade time period to the nominal or average blade time period;
iv) determining the rotational speed by dividing a sensed current blade time period by the correction factor derived for the equivalent blade time period in a previous revolution of the shaft.

2. A method according to numbered paragraph 1 wherein the correction factors for each blade are periodically updated.

3. A method according to any preceding numbered paragraph wherein the correction factors are re-calculated with new sensed blade time periods.

4. A method according to any preceding numbered wherein the correction factors are re-calculated as each new blade time period is sensed.

5. A method according to any preceding numbered paragraph wherein the blades are compressor blades.

6. A method for monitoring gas turbine blades on a rotatable shaft of a gas turbine where the blade tips can move relative to each other, comprising the steps of:
   a. producing a signal train comprising a sequence of signals or pulses, wherein each signal or pulse corresponds to the passage of a blade past a sensor;
   b. determining the blade time period between successive signals or pulses;
   c. calculating an average blade period over a plurality of consecutive blade time periods; and
   d. determining the ratio of a determined blade period to the average blade period.

7. A method according to numbered paragraph 6 for determining whether or not the signal train omits a signal or pulse corresponding to one of the gas turbine shaft's full complement of blades.

8. A method according to any of numbered paragraphs 6 or 7 wherein the determined ratio of a blade period to the average blade period is compared to a number of pre-determined values of said ratio.

9. A method according to numbered paragraph 8, wherein the plurality of consecutive blade periods over which the average blade period is calculated does not include the determined blade period, and wherein the pre-determined values of said ratio are bounded by the possible values of the equations:

$$Ratio_{MAX} = AV \times \frac{D+1+2\times j}{AV+M-2\times j}$$

and $$Ratio_{MIN} = AV \times \frac{D+1-2\times j}{AV+M+2\times j}$$

where: $Ratio_{MAX}$ is the upper boundary value of the ratio. $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

10. A method according to numbered paragraph 8, wherein the plurality of consecutive blade periods over which the average blade period is calculated includes the determined blade period, and wherein the pre-determined values of said ratio are bounded by the possible values of the equations:

$$Ratio_{MAX} = AV \times \frac{D+1+2\times j}{AV+M-D-2\times j}$$

$$Ratio_{MIN} = AV \times \frac{D+1-2\times j}{AV+M-D+2\times j}$$

where: $Ratio_{MAX}$ is the upper boundary value of the ratio. $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

11. A method according to numbered paragraph 6 wherein the average blade period is determining by averaging a series of blade periods signals each representative of a series of measure blade period signals, predicting a value for a first signal from a historical blade period signal value, generating a first calculated blade period signal from the predicted value of the first measurement signal; comparing the measured signal to its predicted value period, and: if the measured signal is within a pre-determined range of acceptable values, using the first measured blade signal to predict a value for a second measured signal blade period; if the measured signal is outside the pre-determined range of acceptable values, using the first predicted value to predict a second measured signal,
   and generating a second calculated blade period signal from the predicted value of the second measured signal.

12. A method according to any of numbered paragraphs 6 to 11 further comprising the step of monitoring the amplitude of the signals or pulses.

13. A method for monitoring the health of a gas turbine according to any preceding numbered paragraph.

14. A method according to any preceding numbered paragraph wherein gas turbine is an industrial gas turbine.

15. A method according to any of numbered paragraphs 1 to 13 wherein the gas turbine is a jet engine.

16. A system for monitoring the rotational speed of the shaft of a gas turbine having a pre-determined number of spaced blades on or rotating with the shaft, and wherein the tips of the blades can move relative to each other, the system including means for monitoring the blade time period between successive blades as they pass a sensor, and means for deriving a correction factor associated with each blade time period for correcting future sensed blade time periods, wherein the system includes:
   i) a sensor for sensing movement of said spaced blades;
   ii) means for determining the current blade time period between the passage of successive spaced blades past the sensor;

iii) means for deriving a correction factor for a said blade time period by:
   a) determining the revolution time period for a single revolution of the shaft past the sensor, by summing the blade time periods over a single revolution of the shaft;
   b) determining an average or nominal blade time period by dividing the revolution time period by the number of spaced blades on or rotating with the shaft; and
   c) determining the correction factor for a said blade time period, the correction factor being the ratio of the blade time period to the nominal or average blade time period;
iv) means for determining the rotational speed by dividing a sensed current blade time period by the correction factor derived for the equivalent blade time period in a previous revolution of the shaft.

17. A system according to numbered paragraph 16 for monitoring the rotational speed of the shaft of a gas turbine having a number of spaced compressor blades on or rotating with the shaft.

18. A system according to any of numbered paragraphs 16 or 17 for monitoring gas turbine blades on a rotatable shaft of a gas turbine where the blade tips can move relative to each other, comprising:
   a. means for producing a signal train comprising a sequence of signals or pulses, wherein each signal or pulse corresponds to the passage of a blade past a sensor;
   b. means for determining the blade time period between successive signals or pulses;
   c. means for calculating an average blade period over a plurality of consecutive blade time periods; and
   d. means for determining the ratio of a determined blade period to the average blade period.

19. A system according to numbered paragraph 18 for determining whether or not the signal train omits a signal or pulse corresponding to one of the gas turbine shaft's full complement of blades.

20. A system according to numbered paragraphs 18 or 19 wherein the determined ratio of a blade period to the average blade period is compared to a number of pre-determined values of said ratio.

21. A system according to numbered paragraph 18, wherein the plurality of consecutive blade periods over which the average blade period is calculated does not include the determined blade period, and wherein the pre-determined values of said ratio are bounded by the possible values of the equations:

$$Ratio_{MAX} = AV \times \frac{D+1+2\times j}{AV+M-2\times j}$$

and $$Ratio_{MIN} = AV \times \frac{D+1-2\times j}{AV+M+2\times j}$$

where: $Ratio_{MAX}$ is the upper boundary value of the ratio; $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to the nominal blade position expressed as a fraction of the nominal blade separation.

22. A system according to numbered paragraph 18, wherein the plurality of consecutive blade periods over which the average blade period is calculated includes the determined blade period, and wherein the pre-determined values of said ratio are bounded by the possible values of the equations:

$$Ratio_{MAX} = AV \times \frac{D+1+2\times j}{AV+M-D-2\times j}$$

$$Ratio_{MIN} = AV \times \frac{D+1-2\times j}{AV+M-D+2\times j}$$

where: $Ratio_{MAX}$ is the upper boundary value of the ratio; $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to the nominal blade position expressed as a fraction of the nominal blade separation.

23. A system according to any of numbered paragraphs 18 to 22, further comprising the step of monitoring the amplitude of the pulses or peaks.

24. A system for monitoring the health of a gas turbine according to any of numbered paragraphs 18 to 23.

25. A system according to any of numbered paragraphs 18 to 24 for monitoring the health of an industrial gas turbine.

26. A system according to any of numbered paragraphs 18 to 24 for monitoring the health of a jet engine.

The invention claimed is:

1. A method of monitoring the rotational speed of the shaft of a gas turbine having a pre-determined number of spaced blades on or rotating with the shaft, and wherein the blades each have a tip and the tips of the blades can move relative to each other, the method including monitoring blade time periods between successive blades as the successive blades pass a sensor, and deriving a correction factor associated with each blade time period for correcting future sensed blade time periods; wherein the method includes the steps of:
   i) providing a sensor for sensing movement of said spaced blades;
   ii) determining a current blade time period between the passage of successive spaced blades past the sensor;
   iii) deriving the correction factor for said blade time period by:
      a) determining a revolution time period for a single revolution of the shaft past the sensor, by summing the blade time periods over a single revolution of the shaft;
      b) determining an average or nominal blade time period by dividing the revolution time period by the total number of spaced blades on or rotating with the shaft; and
      c) determining the correction factor for said blade time period, the correction factor being a ratio of the blade time period to the nominal or average blade time period;

iv) determining the rotational speed by dividing the sensed current blade time period by the correction factor derived for the equivalent blade time period in a previous revolution of the shaft.

2. A method according to claim 1 wherein the correction factors for each blade are periodically updated.

3. A method according to claim 2 wherein the correction factors are re-calculated with new sensed blade time periods.

4. A method according to claim 3 wherein the correction factors are re-calculated as each new blade time period is sensed.

5. A method according to claim 1 wherein the blades are compressor blades.

6. A method according to claim 1 further comprising determining whether or not the signal train omits a signal or pulse corresponding to one of the gas turbine shaft's full complement of blades, such determination comprising the steps of:
  i) producing a signal train comprising a sequence of signals or pulses, wherein each signal or pulse corresponds to the passage of a blade past a sensor;
  ii) determining the blade time period between successive signals or pulses;
  iii) calculating an average blade period over a plurality of consecutive blade time periods; and
  iv) determining the ratio of a determined blade period to the average blade period.

7. A system for monitoring the rotational speed of the shaft of a gas turbine having a pre-determined number of spaced blades on or rotating with the shaft, and wherein the blades each have a tip and the tips of the blades can move relative to each other, the system including means for monitoring blade time periods between successive blades as the successive blades pass a sensor, and means for deriving a correction factor associated with each blade time period for correcting future sensed blade time periods, wherein the system includes:
  i) a sensor for sensing movement of said spaced blades;
  ii) means for determining a current blade time period between the passage of successive spaced blades past the sensor;
  iii) means for deriving the correction factor for said blade time period by:
    a) determining a revolution time period for a single revolution of the shaft past the sensor, by summing the blade time periods over a single revolution of the shaft;
    b) determining an average or nominal blade time period by dividing the revolution time period by the number of spaced blades on or rotating with the shaft; and
    c) determining the correction factor for said blade time period, the correction factor being a ratio of the blade time period to the nominal or average blade time period;
  iv) means for determining the rotational speed by dividing athe sensed current blade time period by the correction factor derived for the equivalent blade time period in a previous revolution of the shaft.

8. A system according to claim 7 for monitoring the rotational speed of the shaft of a gas turbine having a number of spaced compressor blades on or rotating with the shaft.

9. A data processor including software stored on a non-transitory computer readable storage medium for running a routine or routines for performing the method of claim 1.

10. A data processor including software stored on a non-transitory computer readable storage medium for running a routine or routines for performing the method of claim 6.

* * * * *